(12) United States Patent
Potkonjak

(10) Patent No.: US 8,255,743 B2
(45) Date of Patent: Aug. 28, 2012

(54) ERROR DETECTION AND/OR CORRECTION THROUGH COORDINATED COMPUTATIONS

(75) Inventor: Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 185 days.

(21) Appl. No.: 12/463,979

(22) Filed: May 11, 2009

(65) Prior Publication Data

US 2010/0287413 A1 Nov. 11, 2010

(51) Int. Cl.
  *G06F 11/00* (2006.01)
(52) U.S. Cl. .......................... 714/11; 714/38.1
(58) Field of Classification Search .......... 714/10–12, 714/15–23, 38.1, 38.11, 38.12, 38.13, 38.14; 717/124–135
  See application file for complete search history.

(56) References Cited

U.S. PATENT DOCUMENTS

| | | | |
|---|---|---|---|
| 7,017,150 B2 * | 3/2006 | Lam et al. | 717/124 |
| 7,098,144 B2 | 8/2006 | Zhang et al. | |
| 7,255,745 B2 | 8/2007 | Zhang et al. | |
| 7,308,607 B2 * | 12/2007 | Reinhardt et al. | 714/25 |
| 7,606,695 B1 * | 10/2009 | Nouri et al. | 703/22 |
| 2007/0174746 A1 * | 7/2007 | Haefliger et al. | 714/721 |
| 2010/0241892 A1 | 9/2010 | Potkonjak | |
| 2010/0287404 A1 | 11/2010 | Potkonjak | |
| 2010/0287409 A1 | 11/2010 | Potkonjak | |

OTHER PUBLICATIONS

Alkabani, Y. et al., "N-Version Temperature-Aware Scheduling and Binding," International Symposium on Low Power Electronics and Design, Aug. 19, 2009, pp. 331-334.

Andrei, A. et al., "Overhead-Conscious Voltage Selection for Dynamic and Leakage Energy Reduction of Time-Constrained Systems," Proceedings of the Design, Automation and Test in Europe Conference, Feb. 2004, 6 pages.

Catthoor, F. et al., "Samurai: A General and Efficient Simulated-annealing Schedule with Fully Adaptive Annealing Parameters," Integration, the VLSI Journal, 1988, pp. 147-178, vol. 6.

Chandrakasan, A. et al., "HYPER-LP: A System for Power Minimization Using Architectural Transformations," IEEE International Conference on Computer-Aided Design, 1992, pp. 300-303.

Chandrakasan, A. et al., "Optimizing Power Using Transformations," IEEE Transactions on Computer-Aided Design, Jan. 1995, pp. 12-31, vol. 14, No. 1.

Dabiri, F. et al., "Energy minimization for real-time systems with non-convex and discrete operation modes," Design, Automation & Test in Europe Conference, Mar. 2009, pp. 1416-1421.

Hong, I. et al., "On-Line Scheduling of Hard Real-Time Tasks on Variable Voltage Processor," International Conference on Computer-Aided Design, 1998, pp. 653-656.

Hong, I. et al., "Power Optimization of Variable-Voltage Core-Based Systems," IEEE Transaction on Computer-Aided Design of Integrated Circuits and Systems, Dec. 1999, pp. 1702-1714, vol. 18, No. 12.

(Continued)

*Primary Examiner* — Scott Baderman
*Assistant Examiner* — Joseph Kudirka
(74) *Attorney, Agent, or Firm* — Brundidge & Stanger, P.C.

(57) ABSTRACT

Techniques are generally described for addressing computation errors via coordinated computation on two computing platforms are disclosed. In some embodiments, one or more cuts may be taken of a computation to observe variables, and the observations may be analyzed to detect errors. Corrections may be created for the detected errors. The disclosed techniques may be employed in power and/or energy minimization/reduction, and debugging, among other goals. Other embodiments may be disclosed and/or claimed.

35 Claims, 7 Drawing Sheets

OTHER PUBLICATIONS

Hong, I. et al., "Power Optimization using Divide-and-Conquer Techniques for Minimization of the Number of Operations," International Conference on Computer-Aided Design, 1997, pp. 108-111.

Hong, I. et al., "Synthesis Techniques for Low-Power Hard Real-Time Systems on Variable Voltage Processors," Real-Time System Symposium, 1998, pp. 178-187.

Kirovski, D. et al., "System-Level Synthesis of Low-Power Hard Real-Time Systems," Design Automation Conference, Jun. 1997, pp. 697-702.

Lutovac, M. D et al., "Design of computationally efficient elliptic IIR filters with a reduced number of shift-and-add operations in multipliers," IEEE Transactions on Signal Processing, Oct. 1997, pp. 2422-2430, vol. 45, No. 10.

Pillai, P. et al., "Real-time dynamic voltage scaling for low-power embedded operating systems," SIGOPS Oper. Syst. Rev., 2001, pp. 89-102, vol. 35, No. 5.

Qu, G. et al., "Techniques for Energy-Efficient Communication Pipeline Design," IEEE Transactions on VLSI Systems, Oct. 2002, pp. 542-549, vol. 10, No. 5.

Shin, D. et al., "Low-energy intra-task voltage scheduling using static timing analysis," Design Automation Conference Jun. 2001, pp. 438-443.

Vahdatpour, A. et al., "Leakage Minimization Using Self Sensing and Thermal Management," International Symposium on Low Power Electronics and Design, Aug. 2010, pp. 265-270.

Wong, J. L. et al., "Power minimization in QoS sensitive systems," IEEE Transactions on VLSI Systems, Jun. 2004, pp. 553-561, vol. 12, No. 6.

M. Hernandez-Velez "Nanowires and 1D arrays fabrication: An Overview," Thin Solid Films, Jan. 20, 2006, vol. 495, Issues. 1-2, pp. 51-63.

Todd M. Austin, "DIVA: A Dynamic Approach to Microprocessor Verification," Journal of Instruction-Level Parallelism Feb. 2000, pp. 1-26.

\* cited by examiner

ERROR DETECTION AND/OR CORRECTION THROUGH COORDINATED COMPUTATIONS

BACKGROUND

There may be numerous potential sources of errors in computational, communicating, and data storing systems and data processing including algorithmic and data structure errors, compilation mistakes, errors in design specification and design implementation, manufacturing faults, environmental impact, inadequate operational conditions, data alternations, and intentional malicious attacks. Essentially all technological and application trends may be likely to have additional negative impact on the error rates and their impact. For example, feature scaling may exponentially increase the likelihood of radiation errors. Also, the exponentially growing rate of integration may make difficult to produce manufacturing error free integrated circuits and systems. Finally, the complexity of application grows at significantly higher rates than the computational capabilities of silicon. One of the ramifications of a more efficient use of silicon may be increased number of design errors. Even more importantly may be that optimization of all design metrics, including clocking speed, energy, area, manufacturing and testing cost, latency, throughput and reliability, may be inevitably related to the ability to address error. And the ability to address error may be particularly important to low power and/or energy minimization/reduction, and debugging, among other goals.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF EMBODIMENTS

Figure 1:
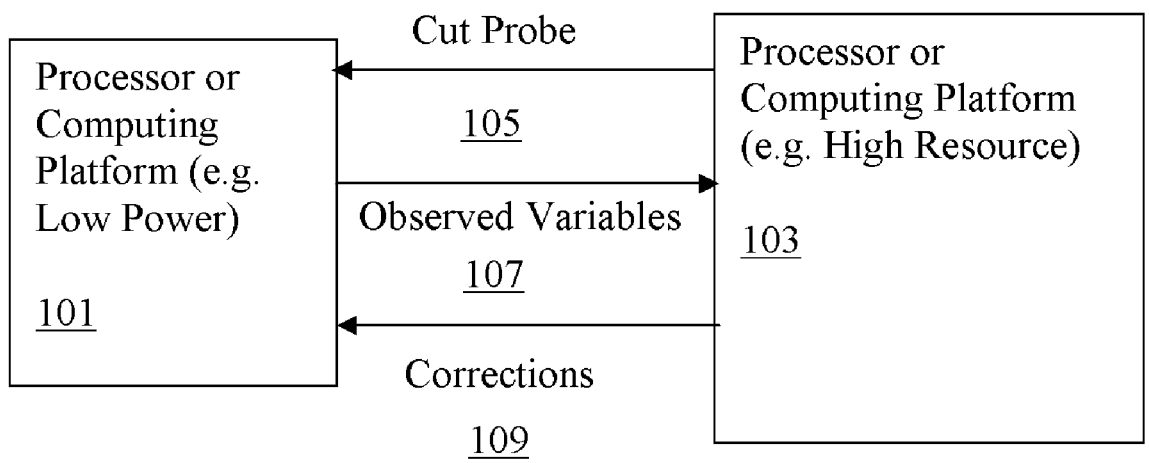
FIG. 1 illustrates an overview of computation error detection and/or correction through coordinated computation, in accordance with various examples.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to addressing computation errors via coordinated computation on two computing platforms. Embodiments of the present disclosure include various techniques to address the issue of computation errors through coordinated computation. In various embodiments, a technique for addressing computation errors comprises methods for error detection, diagnosis, characterization, and correction. In various embodiments, another technique includes synthesis and implementation techniques for facilitating errors addressing. In various embodiments, the techniques may be employed to correct permanent errors due to manufacturing variability.

In the following detailed description, reference is made to the accompanying drawings which form a part hereof, and in which are shown by way of illustration embodiments in which embodiments may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Referring now to FIG. 1, wherein an overview of the present disclosure of addressing computing errors through coordinated computation, in accordance with various embodiments, is illustrated. As shown, for the embodiments, two different processors or computing platforms 101 and 103 may be configured to coordinate execution of the same or similar functionality. At least one of these executions, e.g. execution on processor or computing platform 103, may be conducted in such a way that it may be significantly more robust against large set of errors. Therefore, this or these types of execution may be used as a standard for correcting errors in the other execution, e.g. execution on processor or computing platform 101, done under energy constraints or any other setting where the errors may be more likely due to reasons such as radiation or high temperature.

In various embodiments, processors or computer systems 101 and 103 may be independently provided with the program and input data to be executed in a coordinated manner. At action 105 (Cut Probe), in various embodiments, processor or computing platform 103 may be configured to instruct processor or computing platform 103 on where and when to take a cut of the computation and observe one or more variables at the cut, to be described more fully below. At action 107 (Observed Variables), processor or computing platform 101 may be configured to send real time variables that may be used for error detection to processor or computing platform 103 that executes the same or similar program using the same or similar input data. In various embodiments, on receipt, processor or computing platform 103 may analyze the received variable values, and detect for errors based at least in part on the result of the analysis. At action 109 (Corrections), in various embodiments, processor or computing platform 103 further may diagnose the errors, create corrections to correct one or more of the detected errors, and/or may send instructions to processor or computing platform 103 on how to correct the detected errors.

In alternate embodiments, the processor or computing platform 103 may characterize processor or computing platform 101 in terms of its faults, simulates or emulates its execution and sends the corrective instructions to processor or computing platform 101. The correction may be either data dependent or generic for a pertinent program.

In various embodiments, the present disclosure may be practiced in an off-line manner; in other embodiments, the present disclosure may be practiced in an on-line manner. In an on-line embodiment, the data may be transferred between the involved devices using either wired or wireless communication. In various embodiments, one of the executions may be conducted using tight clock cycle time of a fixed point processor and the other may be done with lax clock cycle time on a floating point processor.

Before further describing embodiments of the present disclosure, it should be noted that for the purpose of this specification, what is considered errors may not be limited to errors on the execution units, in the relevant datapaths, or datapaths themselves, but may include errors of all types of interconnect, memory elements, clock circuitry, power distribution network and any other device that participates in data processing, storage, communication, or acquisition.

Further, in alternate embodiments, error diagnosis and/or creation of correction may be performed on another computing platform other than the computing platform performing the coordinated computation and error detection.

In various embodiments, computing platform 101 may be a wireless computing device such as a mobile phone, a media player, a laptop computer, a personal digital assistant, and so forth. Computing platform 103 on the other hand may be any one of a number of servers.

Figure 2:
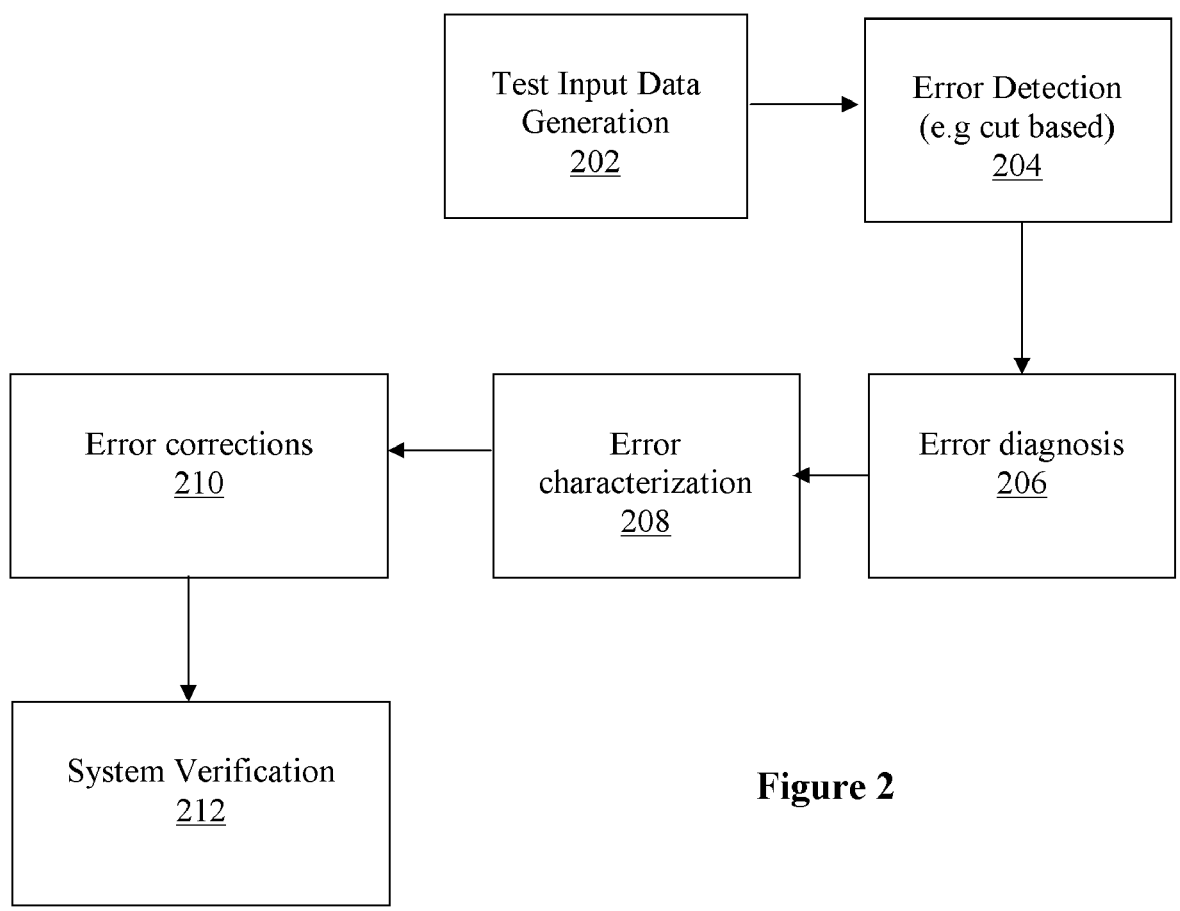
FIG. 2 illustrates a method to address computing errors, in accordance with various examples.

FIG. 2 illustrates a method 200 of the present disclosure to address computing errors in further detail, in accordance with various embodiments. As shown, method 200 may comprise all or a subset of the following operations: (i) Test input data generation 202; (ii) Error detection 204; (iii) Error diagnosis 206; (iv) Errors characterization 208; (v) Error corrections 210; and/or (vi) System verification 212. In block 202, in various embodiments, the goal may be to generate test vectors that cover some or all possible errors in systematic way so that more likely and the higher impact errors may be first identified. These test input may be either identical or different for different phases. At block 204, in various embodiments, error detection may be through cut-based comparison, described more fully below. At block 206, in various embodiments, the process may start with cuts that may be far from each other and gradually introduce more dense cuts in order to facilitate error diagnosis. At block 208, in various embodiments, for error characterization, the process may diagnosis the errors by tracing the variables from one cut to another, described more fully below. At block 210, in various embodiments, for error correction, a spectrum of corrections may be generated, so that user may select one that may be perceived as beneficial. In various embodiments, different corrections may be created for different quality of service (QoS) requirements of different applications. At block 212, in various embodiments, overall system verification may be conducted using e.g. learn-and-test methodology.

Figure 3A:
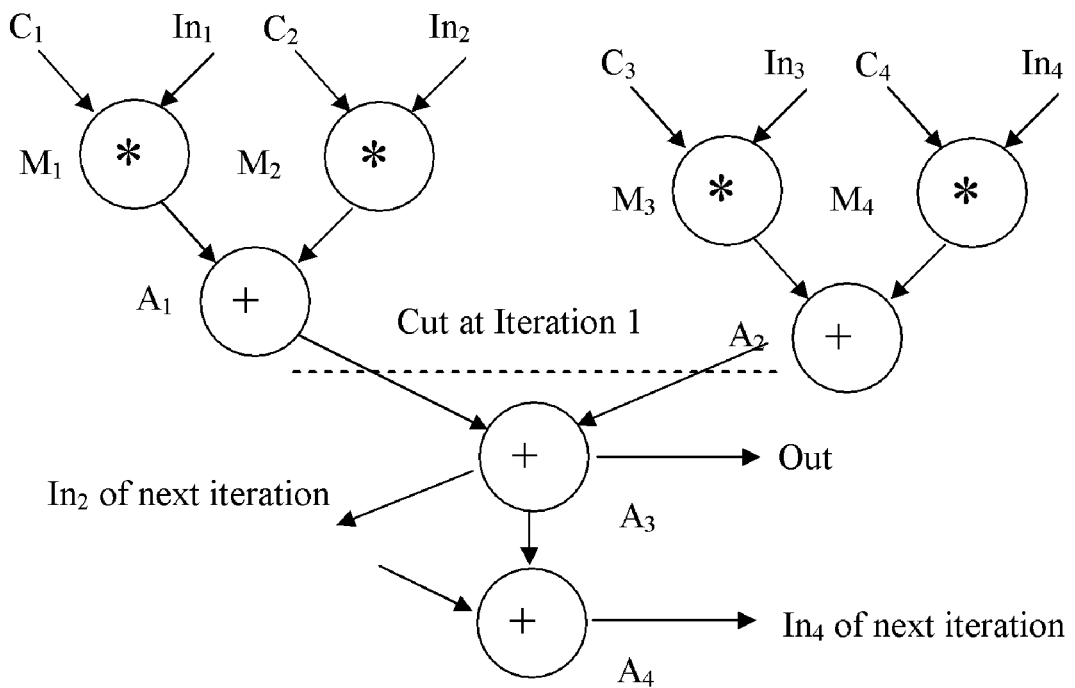
FIGS. 3a-3c illustrate an example computation cut and variable observation, in accordance with various examples.
Figure 3B:
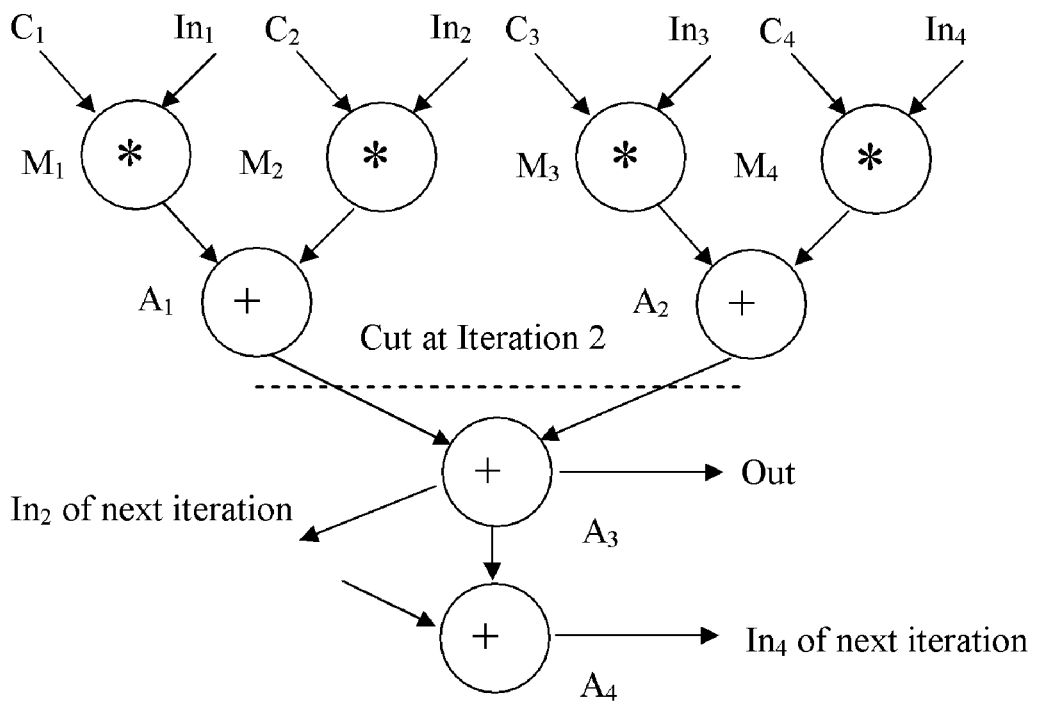
Figure 3C:
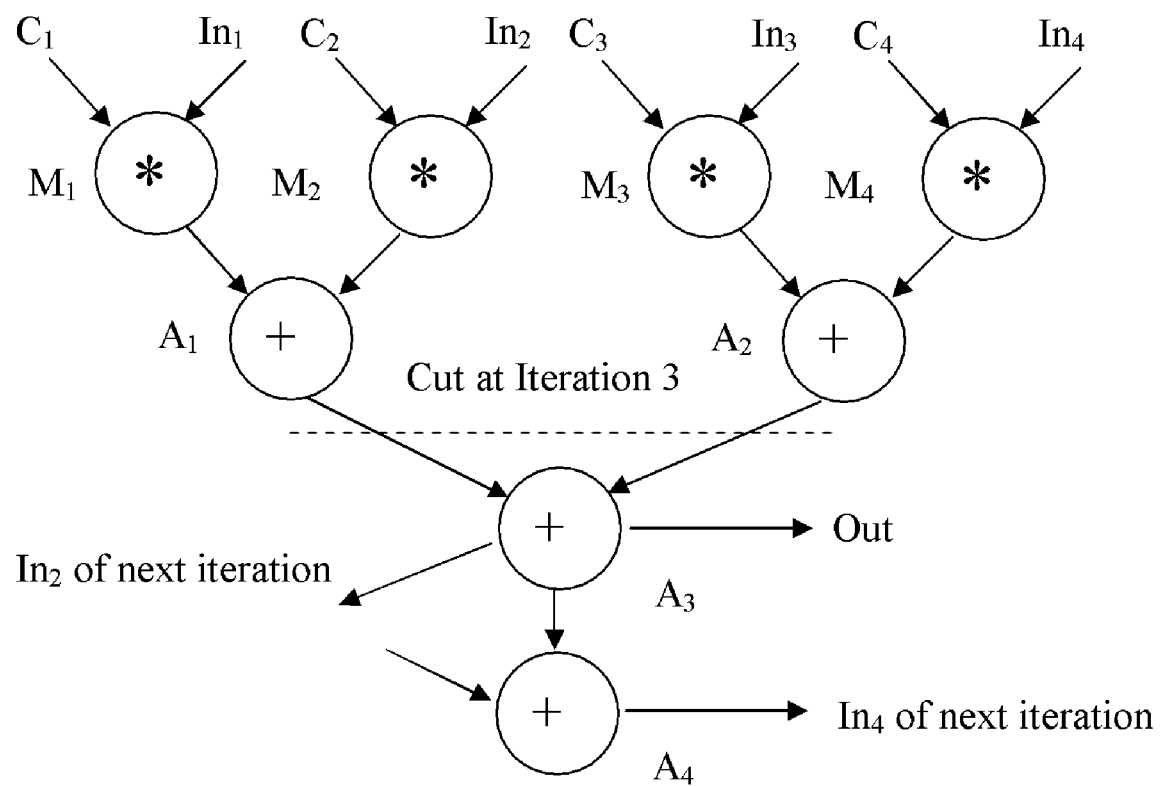

FIGS. 3*a*-3*c* illustrate the concept of cut and variable observation, and their employment for error detection, diagnosis and correction, in accordance with various embodiments of the present disclosure. More specifically, FIGS. 3*a*-3*c* illustrate an example execution of the first three iterations of a small program that may be executed in a very long loop. In this example small program, inputs $In_1$, $In_2$, $In_3$, and $In_4$ are correspondingly multiplied with constants $C_1$, $C_2$, $C_3$, and $C_4$ using multiplier $M_1$, $M_2$, $M_3$, and $M_4$ respectively. The products of the first two multiplications $In_1$ with $C_1$ and $In_2$ and $C_2$, and the products of the last two multiplications $In_3$ with $C_3$ and $In_4$ and $C_4$ are correspondingly added together using accumulators $A_1$ and $A_2$ respectively. The results of the additions are then further added together using accumulators $A_3$. The result is then outputted as well as provided as $In_2$ for the next iteration. Further, the output of accumulators $A_3$ is further combined with another value using accumulators $A_4$ and provided as input $In_4$ for the next iteration.

As illustrated, a cut at the point of the computation where outputs of the multiplications have been initially pairwise added together may be taken (i.e. at the output of accumulator $A_1$ and $A_2$) in each of the three iterations. At each cut, various variables may be observed, and the observations may be used for subsequent error detection, diagnosis and correction.

Before further continuing with the present disclosure, it should be noted that any error between two cuts may be detected by checking only the variable values of the later cut. In addition, one may further reduce the average number of observed variables by checking only the cuts every k-th iterations. Further, while a cut may be taken at each of three iterations of the example execution, the present disclosure is not so restricted; in alternate embodiments, the cuts do not have to be taken periodically.

In various embodiments, the basic scheme for error detection may be by comparing the variable values observed at the cut of the less reliable (e.g. lower energy, less resource) processor or computing platform with the variable values observed at the cut of the more reliable (e.g. higher energy, more resource) processor computing platform. In various embodiments, the reliability and the accuracy of the trusted processor or computing platform may be further improved by employing high precision arithmetic, enforcement of favorable operational and environmental conditions, and double, triple or higher redundancy.

In various embodiments, the variable values of each cut may be observed. The cut variables represent a set of states and/or inputs that completely defined some or all consequent outputs. The location of a cut, and the frequency of taking cuts may be application dependent. In various embodiments, the cuts may be improved or optimized according to a variety of objectives including but not limited to their cardinality; difficulty of correcting the cuts variables, and suitability for compression and/or decompression.

In various embodiments, error diagnosis may be conducted between two consecutive cuts where some or all variables in the earlier cut may be correct. An error may be considered to be detected if at least one variable in a later cut is not correct. In various embodiments, error diagnosis further comprises backward tracing of the incorrect variables starting from the later cut. In instances where the correct value on one of the inputs is detected, the search along that direction may be terminated. Accordingly, the source for each detected error may be determined.

It should be noted that error diagnosis may not necessarily be performed for error correction, as errors may or may not have to be performed at the same places where they may be introduced. Consider the case where two chained adders have permanent manufacturing faults. The first adder, for example, increases the result by seven, and the second reduces the sum by nine systematically. It is easy to see that it may be sufficient to increase one of the inputs by two in order to always correctly rectify the two chained adders. However, the diagnosis of errors may be illuminating for design and operation of the processors or computing systems by revealing what should be altered in order to prevent a particular error or a type of error.

As alluded to earlier, in various embodiments, tracing may be performed by comparing the complete cuts of the program. The search may be conducted between the first cut where the differences between the variable values of the two computing platforms may be observed, and the previous cut. Either forward or backward search may be used. In various embodiments, the assumption may be made that there are no canceling errors, since errors that may be cancelled do not have to be addressed. Cancellation of two or more errors happens when, for example, one addition increases the output variable by the same amount, as the consequent addition reduces.

In various embodiments, error classification may be conducted by identifying the properties of errors and by grouping the actually observed errors with similar values according to one or more properties together. In various embodiments, the error properties may include the source (e.g, bitwidth, clock cycle time, operational conditions, environment), permanency (single cycle, multiple cycles, permanent), the sequential depth of combinational logic where the error may be observed, suitability for corrections according to input data, variable, and program alternations, the impact on the accuracy in terms of the impacted output variables and their change, and the percentage of devices where the pertinent error may be likely to occur. In various embodiments, error classification may be performed based at least in part on the likelihood of presence of a error type on the less reliable processor or computing platform.

In various embodiments, error correction may be conducted at the places where the errors occurred. In other embodiments, some or all errors may be corrected at the cut variables. In still other embodiments, the permanent faults may be corrected using addition program instructions inserted before or after operation executed at a faulty execution unit or stored in a faulty register.

In various embodiments, correction of errors may be conducted using any combination of mechanisms including but not limited to the following five ways: (i) data corrections; (ii) constant and variable corrections; (iii) program or computational structure corrections; (iv) operational conditions corrections; and/or (v) environment alternations. The corrections may be limited to a single data set executed using a given software and/or hardware implemented functionality, may be specific or generic with respect to the source of errors, and may target automatic correction of a specific types of errors without need to consider a specific input datasets. In various embodiments, the correction may be complete in the sense that the results on the considered platforms may be identical to one with the highest reliability and accuracy or may be partial and conducted in such a way that a specific objective error norm or subjective quality of service criteria may be satisfied. In addition, the corrections may be conducted so that a specific operational metrics such as the latency and throughput may be satisfied.

In various embodiments, error corrections may be conducted using one or more of the mechanisms that include but are not limited to program, inputs, and variables alternation and conditions and environment alternations. Selecting a way for compensation may be driven by design and operation metrics and the architecture, operating system, system software and other implementation and operational issues. For example, if communication is much more expensive than computation, than the primary goal may be to reduce the required amount of communication. Therefore, selecting a small cut where the corrections may be suitable for compression may be favored as compared to the simplicity of correcting the output or the inputs.

As described earlier, due to technological and application trends, it may be likely that it may be difficult to manufacture fault-free integrated circuits. In addition, the complexity of hardware, system and utility software may result into frequent error corrections. In order to address this, a technique for addressing error may additionally or alternatively include (i) Systematic errors correction for an arbitrary inputs to an arbitrary or a specific program/functionality; and/or (ii) Synthesis for error correction.

In various embodiments, synthesis for error correction comprises of a set of synthesis and implementation decisions that support any of the earlier described operations for systematic errors correction for an arbitrary inputs to an arbitrary or a specific program/functionality. In various embodiments, a special emphasis may be placed in error correction where hardware may be added to allow rapid correction of internal variables. In various embodiments, scheduling slots may be intentionally left empty for error correction. In other embodiments, built-in-self-repair techniques may be employed for correction of manufacturing variability errors.

Figure 4:
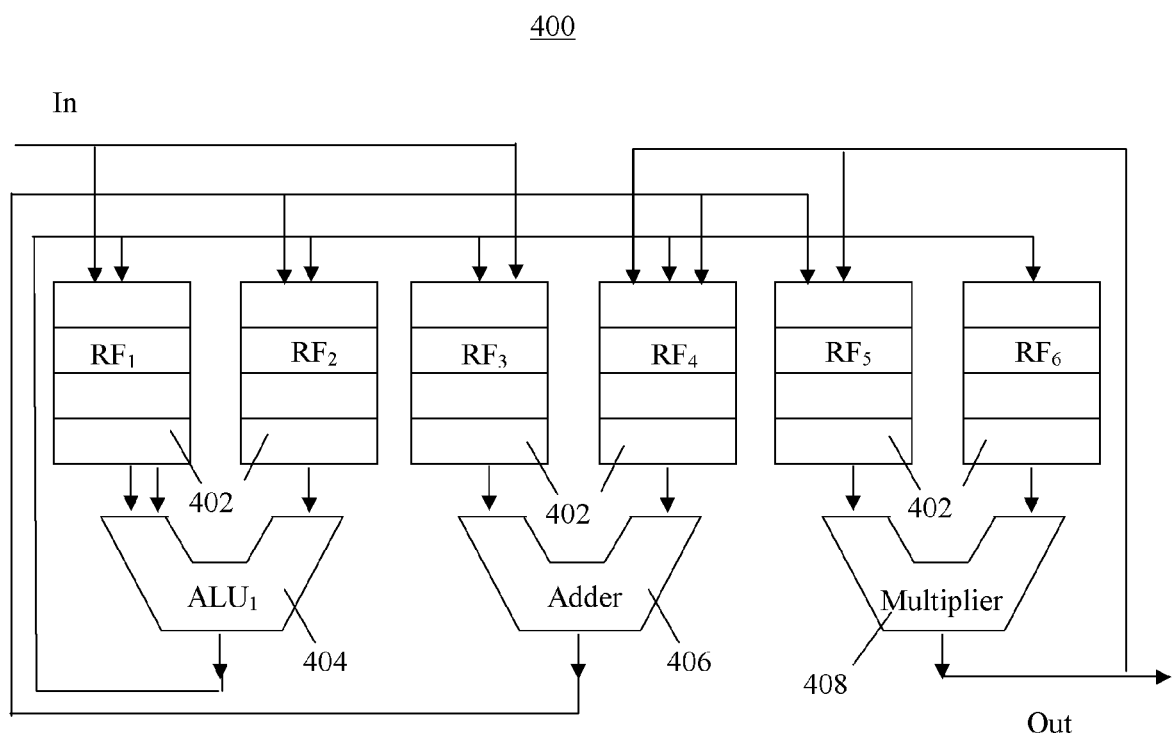
FIG. 4 illustrates an example processor with implementation decisions that facilitate addressing errors, including error detection and correction through coordinated computation, in accordance with various examples.

FIG. 4 illustrates an example processor 400 with implementation decisions that facilitate addressing errors, including error detection and correction through coordinated computation as earlier described, in accordance with various embodiments of the present disclosure. As shown, the processor 400 includes a widely used dedicated register file architecture where some or all registers 402 may be grouped in a number of register files $RF_1, RF_2, RF_3, RF_4, RF_5,$ and $RF_6$ in order to share access logic and reduce interconnect, and each register file $RF_1, RF_2$ et al may be connected to an input one of the execution units. In particular, for the illustrated embodiments, there may be three execution units arithmetic logic unit (ALU) 404, adder 406, and multiplier 408. Registers files RF1 and RF2 may be coupled to the ALU 404, register files RF3 and RF4 may be coupled to the adder 406, and register files RF5 and RF6 may be coupled to the multiplier 408. Note that the there may be direct connection from the input port only to register files RF1 and RF4 and that there may be a direct connection to the output only from the output of the multiplier. In various embodiments, in synthesis for error detection and correction, variables that are observed to be ones that are result of one of the multiplications may be stored in register files RF1 and RF4, and the corrections may be applied to variables that are stored in register files RF1 and RF4. Thus, the hardware organization making the example processor particularly suitable for practicing the earlier described approaches to error detection and/or correction.

Figure 5:
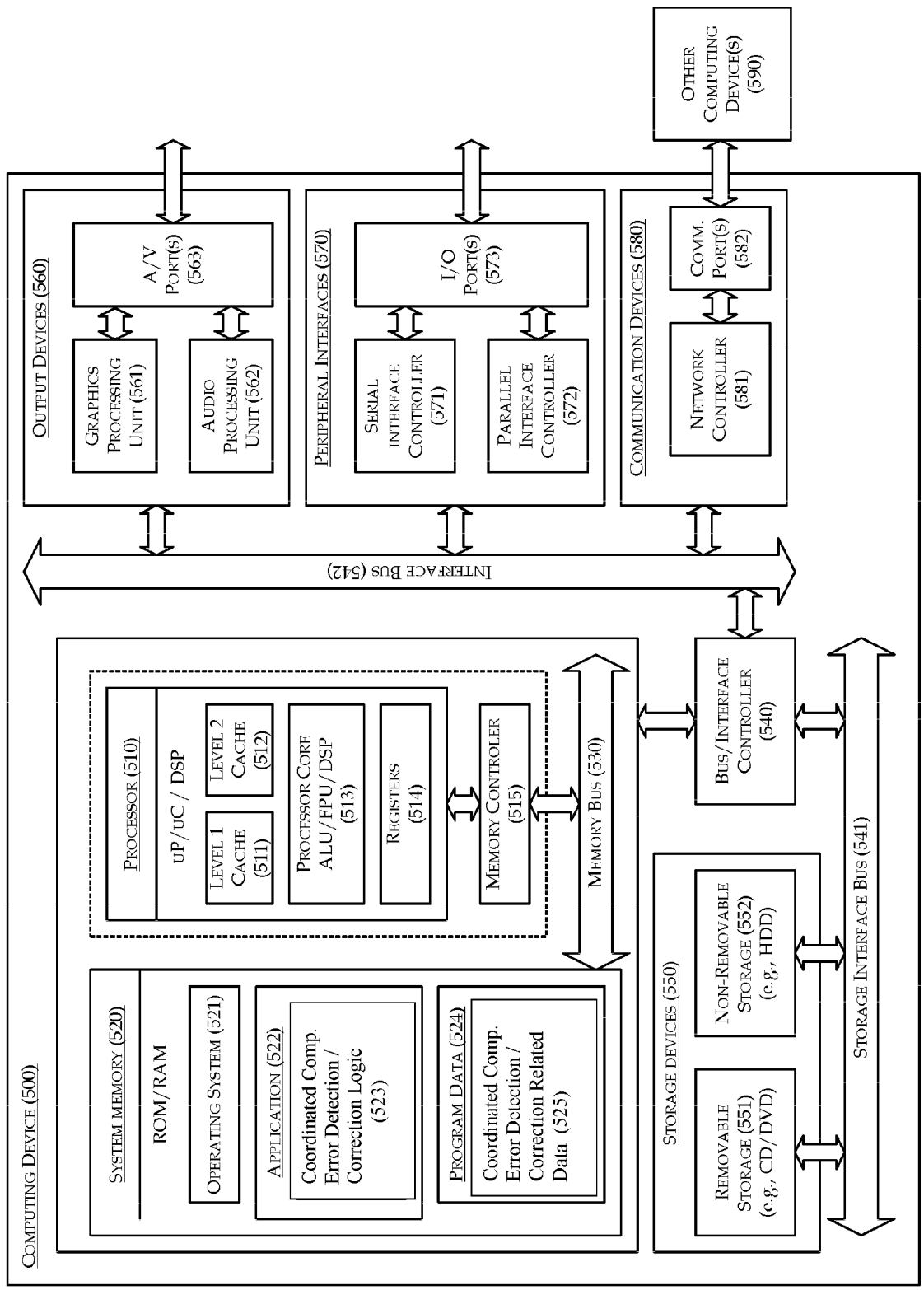
FIG. 5 illustrates a computing system configured in accordance with various examples.

FIG. 5 is a block diagram illustrating an example computing device configured in accordance with the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 12, a processor core 513, and registers 514. An example processor core 513 may include an arithmetic logic unit (ALU), a floating point unit (FPU), a digital signal processing core (DSP Core), or any combination thereof. An example memory controller 515 may also be used with the processor 510, or in some implementations the memory controller 515 may be an internal part of the processor 510.

Depending on the desired configuration, the system memory 520 may be of any type including but not limited to volatile memory (such as RAM), non-volatile memory (such as ROM, flash memory, etc.) or any combination thereof. System memory 520 may include an operating system 521, one or more applications 522, and program data 524. Application 522 may include programming instructions providing logic to implement the above described coordinated computation based error detection and correction. Program Data 524 may include the applicable and related coordinated computation based error detection and correction data values.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of device 500.

Computing device 500 may also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

Figure 6:
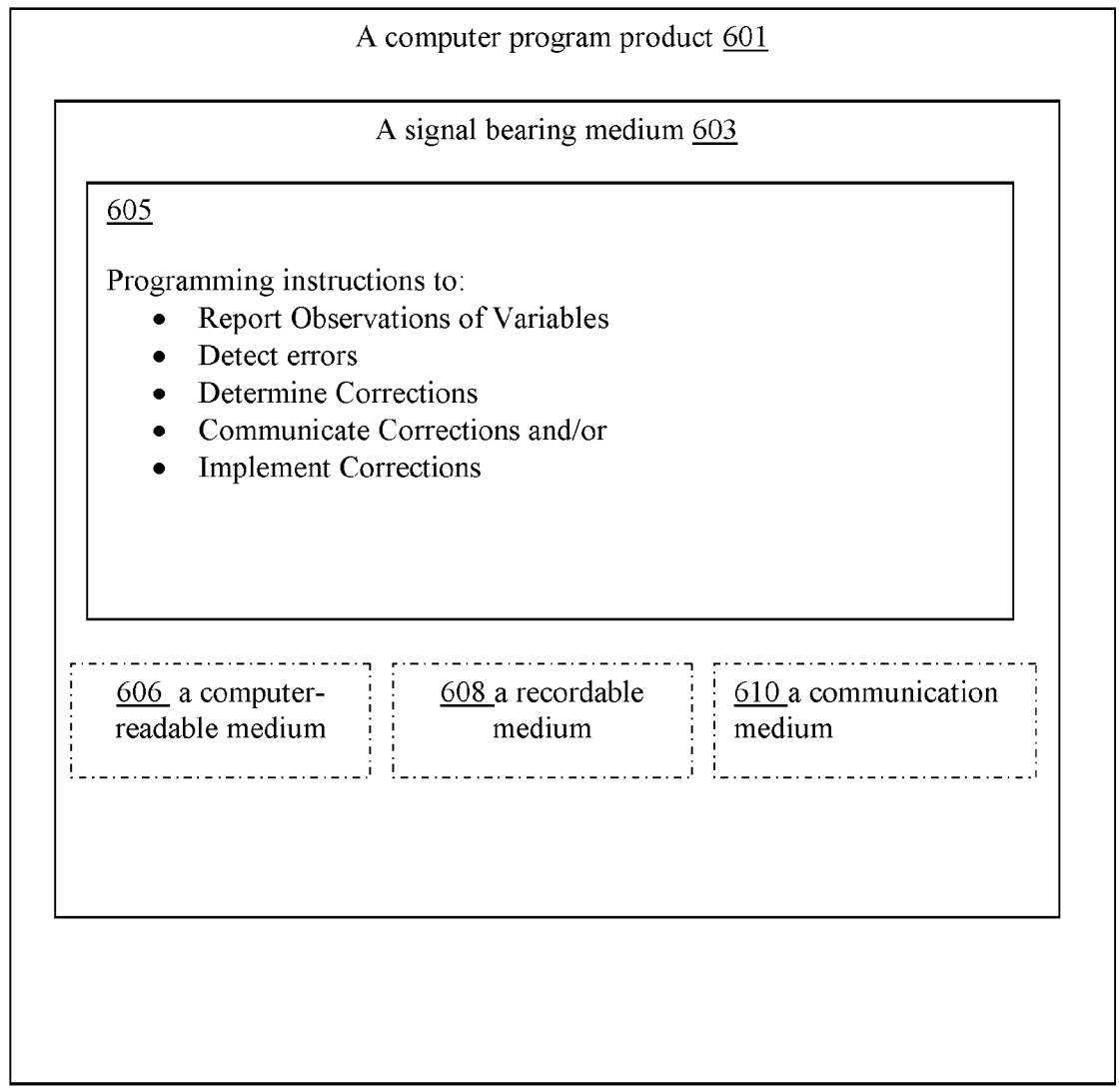
FIG. 6 illustrates a computing program product in accordance with various examples, all arranged in accordance with the present disclosure.

FIG. 6 illustrates a block diagram of an example computer program product 600, all arranged in accordance with the present disclosure. In some examples, as shown in FIG. 6, computer program product 600 includes a signal bearing medium 602 that may also include programming instructions 604. Programming instructions 604 may be for receiving one or more observations of one or more variables of one or more cuts of a computation performed on another computing platform using one or more input data. Programming instructions 604 may also be for detecting one or more errors of the computation performed on the another computing platform, based at least in part on the observations of the one or more variables of the cut of the computation. Further, programming instructions 604 may be for determining a set of one or more corrections, and providing to the another computing platform, the set of one or more corrections. In some embodiments, programming instructions 604 may also be for implementing a set of provided corrections.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute programming instructions 604 to be executed by logic. Computer readable medium 606 and recordable medium 608 may include, but are not limited to, a flexible disk, a hard disk drive (HDD), a Compact Disc (CD), a Digital Video Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and that the favored vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This application is intended to cover any adaptations or variations of the embodiments discussed herein. Therefore, it is manifestly intended that embodiments of the disclosure be limited only by the claims and the equivalents thereof.

What is claimed is:

1. A method, comprising:
    performing a first computation by a first computing platform, executing a first copy of a program, in coordination with a second computing platform performing a second computation, executing a second copy of the same program;
    receiving by the first computing platform, an observation of one or more variables taken at a cut of the second computation performed on the second computing platform;
    detecting by the first computing platform, one or more errors of the second computation, based at least in part on the observation of the one or more variables received, and based at least in part on one or more variables taken at a corresponding cut of the first computation;
    determining one or more corrective actions to correct the one or more detected errors; and
    providing to the second computing platform, instructions about the one or more corrective actions, wherein providing comprises providing one or more instructions on a corrective action to correct a detected error, wherein the corrective action includes insertion of one or more instructions into the second computation at a location before or after an instruction of the second copy of the program is executed at a faulty hardware execution unit of the second computing platform, or at a location before or after a result of an instruction of the second copy of the program is stored into a faulty register of the second computing platform, wherein the hardware execution unit includes at least one of an arithmetic logic unit, an adder, or a multiplier.

2. The method of claim 1, further comprising instructing by the first computing platform, the second computing platform on where and when to take a cut of the second computation.

3. The method of claim 1, wherein the determining and providing are performed on a third computing platform, wherein the first and third computing platforms are different computing platforms.

4. The method of claim 1, wherein said receiving is first receiving, and the method further comprises second receiving by the first computing platform, a second observation for one or more variables at a second cut of the second computation, taken by the second computing platform at a first point in time, and the observation of one or more variables at a cut of the second computation received by the first computing platform is taken by the second computing platform at a second later point in time, wherein said second receiving is before said first receiving, and wherein the second computation is k iteration(s) later at the second later point in time, when compared to the second computation at the first point in time, where k is an integer greater than or equal to 1.

5. The method of claim 4, wherein determining comprises tracing the execution between the first and second points in time.

6. The method of claim 4, wherein at least one of the detection or determination is performed in view of a likelihood of presence of a type of error at the second computing platform or in view of a characteristic of the second computing platform.

7. The method of claim 4, wherein the method further comprises receiving by the first computing platform, a third observation for one or more variables at a third cut of the second computation, taken by the second computing platform at a third point in time later than the second point in time by an amount that is different from an amount the second point in time is later than the first point in time.

8. The method of claim 1, wherein providing comprises providing one or more instructions about a corrective action to correct a detected error at a selected one of a location in the second copy of the program where the error occurred for the second computation, or at a variable in the second copy of the program.

9. A method comprising:
    performing a first computation, by a first computing platform, executing a first copy of a program using one or more input data, the first computing platform configured to perform the first computation with a second computing platform performing a second computation in a coordinated manner, the second computation executing a second copy of the same program;
    observing one or more variables at a cut of the first computation, by the first computing platform;
    sending the observation of the one or more variables at the cut of the first computation from the first computing platform to the second computing platform; and
    receiving instructions by the first computing platform, about one or more corrective actions for one or more errors of the first computation, wherein receiving instructions comprises receiving instructions by the first computing platform on a corrective action to correct a detected error, wherein the corrective action includes insertion of one or more instructions into the first computation at a location before or after an instruction of the program is executed at a faulty hardware execution unit of the first computing platform, or at a location before or after a result of an instruction of the program is stored into a faulty register of the first computing platform, wherein the hardware execution unit includes at least one of an arithmetic logic unit, an adder, or a multiplier.

10. The method of claim 9 wherein observing one or more variables comprises observing the one or more variables at a first point in time, and the method further comprises the first computing platform repeating the observing for another cut at a second later point in time, and then, repeating the sending.

11. The method of claim 10, wherein the first computation is k iteration(s) later at the second later point in time, when compared to the first computation at the first point in time, where k is an integer greater than or equal to 1.

12. The method of claim 10, further comprising observing one or more variables of a third cut of the first computation at a third point in time, by the first computing platform, wherein the third point in time is later than the second point in time by an amount that is different from an amount the second point in time is later than the first point in time.

13. The method of claim 9, wherein receiving instructions comprises receiving instructions on the one or more corrective actions, by the first computing platform, from the second computing platform.

14. The method of claim 9, further comprising performing the one or more corrective actions, by the first computing platform.

15. The method of claim 9, wherein receiving instructions comprises receiving instructions by the first computing platform, to correct a detected error at a selected one of a location of the first computation where the error occurred or at a variable of the first computation.

16. The method of claim 9, wherein observing comprises reading a first register of the first computing platform; and receiving comprises receiving instructions to take one or more corrective actions at a second register of the first computing platform that is different from the first register.

17. The method of claim 9 wherein receiving instructions comprises receiving instructions by the first computing platform, to correct a detected error by controlling an operating or environmental condition of the first computing platform.

18. The method of claim 9, wherein receiving instructions comprises receiving instructions from by the first computing platform, to partially correct the one or more detected errors in view of one or more quality of service criteria of the first computing platform.

19. The method of claim 9, wherein receiving instructions comprises receiving instructions by the first computing platform, to correct a detected error by causing a circuit of the first computing platform to be invoked under a compilation or execution time condition.

20. The method of claim 9, wherein receiving instructions comprises receiving instructions by the first computing platform, to add an application specific or reconfigurable circuit to the first computing platform to address one of the one or more detected errors.

21. The method of claim 9, further comprises as result of the observing, sending and receiving, operating the first computing platform with an energy consumption rate that is smaller than an operational energy consumption rate of the second computing platform.

22. An apparatus comprising:
circuitry configured to perform a first computation, executing a first copy of a program, in coordination with another apparatus performing a second computation, executing a second copy of the program; and
a controller coupled to the circuitry and configured to receive an observation of one or more variables at a cut of the second computation, and to detect one or more errors of the second computation, based at least in part on the one or more observations of the one or more variables at the cut of the second computation, and one or more observations of the variables at a corresponding cut of the first computation, wherein the controller is further configured to determine one or more corrective actions to correct the one or more detected errors of the second computation, and provide to the other apparatus, instructions about the one or more corrective actions, wherein provide comprises provide one or more instructions on a corrective action to correct a detected error, wherein the corrective action includes insertion of one or more instructions into the second computation at a location before or after an instruction of the second copy of the program is executed at a faulty hardware execution unit of the second computing platform, or at a location before or after a result of an instruction of the second copy of the program is stored into a faulty register of the second computing platform, wherein the hardware execution unit includes at least one of an arithmetic logic unit, an adder, or a multiplier.

23. The apparatus of claim 22, wherein the controller is further configured to instruct the other apparatus on where to take a cut of the second computation, and when to observe the one or more variables at the cut of the second computation.

24. The apparatus of claim 22, wherein said receive is a first receive, and the controller is further configured to second receive a second observation for one or more variables at another cut of the second computation, taken by the other apparatus at a first point in time, wherein the observation of one or more variables of a cut of the second computation is taken by the other apparatus at a second later point in time, wherein said second receive is before said first receive, and wherein the computation is k iteration(s) later at the second later point in time, when compared to the computation at the first point in time, where k is an integer greater than or equal to 1.

25. The apparatus of claim 24, wherein the controller is further configured to trace the execution between the first and second points in time.

26. An apparatus comprising:
circuitry configured to perform a first computation, executing a first copy of a program using one or more input data, in a coordinated manner with another apparatus performing a second computation, executing a second copy of the program; and
a controller coupled to the circuitry and configured to:
observe one or more variables at a cut of the first computation;
send the observation of the one or more variables at the cut of the first computation from the apparatus to the another apparatus for the another apparatus or a third apparatus to detect one or more errors of the first computation, and to determine one or more corrective actions to correct the one or more detected errors; and
receive instructions about the one or more corrective actions to correct one or more of the detected one or more errors, wherein receive instructions comprises receive instructions on a corrective action to correct a detected error, wherein the corrective action includes insertion of one or more instructions into the first computation at a location before or after an instruction of the program is executed at a faulty hardware execution unit of the apparatus, or at a location before or after a result of an instruction of the program is stored into a faulty register of the apparatus, wherein the hardware execution unit includes at least one of an arithmetic logic unit, an adder, or a multiplier.

27. The apparatus of claim 26, wherein the controller is further configured to repeat the observation for another cut at a later point in time, and then, repeat the sending of the observation.

28. The apparatus of claim 27, wherein the controller is configured to repeat the observation and sending when the first computation is k iteration(s) later at the later point in time, where k is an integer greater than or equal to 1.

29. The apparatus of claim 26, wherein the apparatus further comprises first and second register files, and for the controller is configured to observe variables stored in the first register file, and apply corrective actions to variables stored in the second register file.

30. The apparatus of claim 26, wherein the apparatus is a wireless mobile computing platform.

31. An article of manufacture comprising:
a computer readable storage medium; and
a plurality of programming instructions stored therein, the programming instructions configured to program and enable an apparatus, on execution of the programming instructions, to:
receive an observation of one or more variables taken at a cut of a first computation performed on another apparatus, associated with execution of a first copy of a program;
detect one or more errors of the first computation performed on the other apparatus, based at least in part on the one or more observations of the one or more variables taken at the cut of the first computation, and one or more observations of the variables at a corresponding cut of a second computation performed on the apparatus, associated with execution of a second copy of the same program;
determine one or more corrective actions to correct the one or more detected errors of the first computation; and
provide to the other apparatus, instructions about the one or more corrective actions, wherein provide comprises provide one or more instructions on a corrective action to correct a detected error, wherein the corrective action includes insertion of one or more instructions into the second computation at a location before or after an instruction of the second copy of the program is executed at a faulty hardware execution unit of the second computing platform, or at a location before or after a result of an instruction of the second copy of the program is stored into a faulty register of the second computing platform, wherein the hardware execution unit includes at least one of an arithmetic logic unit, an adder, or a multiplier.

32. The article of manufacture of claim 31 wherein the programming instructions further enable the apparatus to
perform the second computation in coordination with the another apparatus, and
take the one or more observations of the variables at the corresponding cut of the second computation performed on the apparatus.

33. The article of manufacture of claim 31 wherein the programming instructions further enable the apparatus to instruct the another apparatus where to make the cut of the first computation, and when to take observation of the one or more variables at the cut.

34. An article of manufacture comprising:
a computer readable storage medium; and
a plurality of programming instructions stored therein, the programming instructions configured to program and enable an apparatus, on execution of the programming instruction to:
perform a first computation, associated with an execution of a first copy of a program, using one or more input data in a coordinated manner with another apparatus enabled to perform a second computation, associated with an execution of a second copy of the same program;
observe one or more variables at a cut of the first computation at a first point in time;
send the observation of the one or more variables at the cut of the first computation at the first point in time from the apparatus to another apparatus for the other apparatus to detect one or more errors of the first computation, and for the other apparatus to determine one or more corrective actions to correct one or more of the one or more detected errors; and
receive instructions from the other apparatus about the one or more corrective actions to correct one or more of the one or more detected errors, wherein receive instructions comprises receive instructions on a corrective action to correct a detected error, wherein the corrective action includes insertion of one or more instructions into the first computation at a location before or after an instruction of the program is executed at a faulty hardware execution unit of the apparatus, or at a location before or after a result of an instruction of the program is stored into a faulty register of the apparatus, wherein the hardware execution unit includes at least one of an arithmetic logic unit, an adder, or a multiplier.

35. The article of manufacture of claim 34, wherein the programming instructions further enable the apparatus to
observe one or more variables at another cut of the first computation at a second point in time; and
send the observation of the one or more variables at the another cut of the first computation at the second point in time from the apparatus to the another apparatus.

* * * * *

UNITED STATES PATENT AND TRADEMARK OFFICE
CERTIFICATE OF CORRECTION

PATENT NO. : 8,255,743 B2
APPLICATION NO. : 12/463979
DATED : August 28, 2012
INVENTOR(S) : Potkonjak Page 1 of 2

It is certified that error appears in the above-identified patent and that said Letters Patent is hereby corrected as shown below:

In the Drawings:

In Fig. 2, Sheet 2 of 7, insert Tag -- 200 --, above the figure.

In Fig. 2, Sheet 2 of 7, Box "204", in Line 2, delete "(e.g" and insert -- (e.g. --, therefor.

In Fig. 5, Sheet 6 of 7, below "PROCESSOR (510)", in Line 1, delete "uP/uC" and insert -- µP/µC --, therefor.

In Fig. 6, Sheet 7 of 7, delete "601" and insert -- 600 --, therefor.

In Fig. 6, Sheet 7 of 7, delete "603" and insert -- 602 --, therefor.

In Fig. 6, Sheet 7 of 7, delete "605" and insert -- 604 --, therefor.

In the Specifications:

In Column 5, Line 28, delete "(e.g," and insert -- (e.g., --, therefor.

In Column 6, Line 17, delete "include" and insert -- include: --, therefor.

In Column 6, Line 45, delete "RF1" and insert -- $RF_1$ --, therefor at each occurrence throughout the specification.

In Column 6, Line 45, delete "RF2" and insert -- $RF_2$ --, therefor.

In Column 6, Line 46, delete "RF3" and insert -- $RF_3$ --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,255,743 B2

In Column 6, Line 46, delete "RF4" and insert -- $RF_4$ --, therefor at each occurrence throughout the specification.

In Column 6, Line 47, delete "RF5" and insert -- $RF_5$ --, therefor.

In Column 6, Line 47, delete "RF6" and insert -- $RF_6$ --, therefor.

In Column 7, Line 4, delete "12," and insert -- 512, --, therefor.

In Column 7, Line 19, delete "logic" and insert -- logic 523 --, therefor.

In Column 7, Line 22, delete "values." and insert -- values 525. --, therefor.

In Column 7, Line 34, delete "(HDD)," and insert -- (HDDs), --, therefor.

In Column 7, Line 36, delete "(SSD)," and insert -- (SSDs), --, therefor.

In Column 7, Line 46, delete "(DVD)" and insert -- (DVDs) --, therefor.

In the Claims:

In Column 11, Line 19, in Claim 1, delete "method," and insert -- method --, therefor.

In Column 12, Line 53, in Claim 10, delete "claim 9" and insert -- claim 9, --, therefor.

In Column 13, Line 18, in Claim 17, delete "claim 9" and insert -- claim 9, --, therefor.

In Column 13, Line 23, in Claim 18, delete "from by the" and insert -- by the --, therefor.

In Column 15, Line 36, in Claim 32, delete "claim 31" and insert -- claim 31, --, therefor.

In Column 15, Line 43, in Claim 33, delete "claim 31" and insert -- claim 31, --, therefor.

In Column 16, Line 9, in Claim 34, delete "instruction" and insert -- instructions --, therefor.